Aug. 30, 1960     E. KALLMEYER     2,950,621

BLOOD PRESSURE MEASURING APPARATUS

Filed Dec. 4, 1957     3 Sheets-Sheet 1

INVENTOR:
Erich Kallmeyer,
by Hans Hefter,
Attorney.

Aug. 30, 1960  E. KALLMEYER  2,950,621
BLOOD PRESSURE MEASURING APPARATUS
Filed Dec. 4, 1957  3 Sheets-Sheet 2

INVENTOR:
Erich Kallmeyer,
by Hans Hefter,
Attorney.

2,950,621

BLOOD PRESSURE MEASURING APPARATUS

Erich Kallmeyer, 3 Flinsberger Platz, Berlin-Grunewald, Germany

Filed Dec. 4, 1957, Ser. No. 700,659

Claims priority, application Germany Dec. 8, 1956

1 Claim. (Cl. 73—402)

This invention relates to apparatus for measuring blood pressure, and more specifically to a blood pressure measuring apparatus which is accommodated in a portable housing having a bottom, side and end walls and a hinged cover, and in which apparatus the blood pressure is measured by means of a mercury column filling part of a measuring tube which, with all parts coordinated to it—such as a measuring scale, a source of mercury in the form of a mercury reservoir and a yoke connecting the mercury reservoir with the measuring tube—is arranged on the inner side of the cover of the housing adjacent and along one of the narrow sides thereof so that when the apparatus is not in use, the measuring tube and its parts are mounted so that they are protected in the housing when the cover of the housing is swung into a closed position and the housing is then easily transportable. For reasons known to every one skilled in the art, the connection between the source of mercury and the measuring tube must be interrupted when the apparatus is not in use and it is, therefore, the object of the invention to provide an apparatus for measuring blood pressure in which the interruption of the connection and also the re-establishment of said connection takes place automatically by means of a tap-like element or the like cooperating with an abutment on the bottom of the housing when the cover is being swung.

A preferred embodiment of the invention is illustrated by way of example in the accompanying drawings in which.

Figure 1:
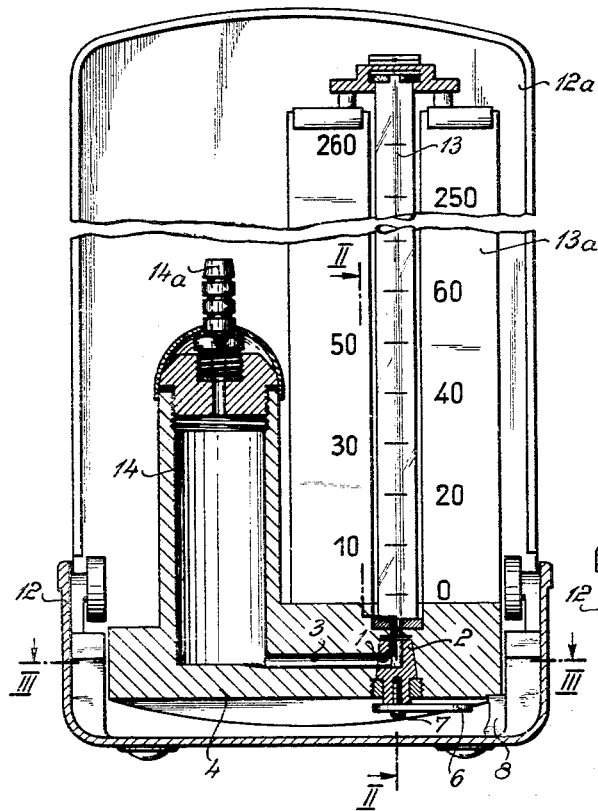
Fig. 1 is a vertical section through a blood pressure measuring apparatus and housing with opened cover.
Figure 2:
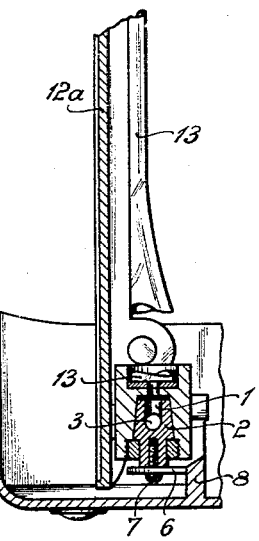
Fig. 2 is a vertical section taken on line II—II of Fig. 1.
Figure 3:
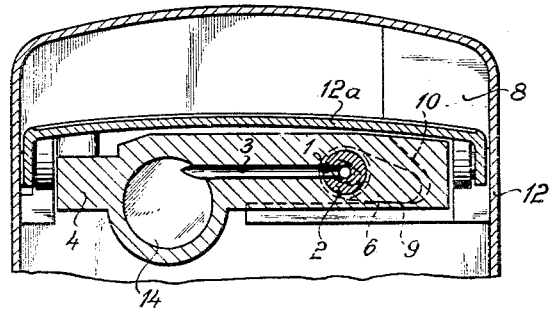
Fig. 3 is a vertical section taken on line III—III of Fig. 1.

As shown in Figs. 1, 2 and 3 the apparatus for measuring blood pressure by means of a mercury column is accommodated in a portable rectangular housing 12 with a bottom, side and end walls and a hinged cover 12a. All parts of the apparatus are so mounted that they are protected in the housing 12 when the apparatus is not in use; these parts consist of a measuring tube 13 for the mercury column to which a measuring scale 13a is coordinated, a source of mercury in the form of a mercury reservoir 14 with a nipple 14a for receiving a hose, and a yoke 4 connecting the mercury reservoir 14 with the measuring tube 13, all of said parts being mounted on the inner side of the cover 12a adjacent and along one of the narrow sides thereof.

The connecting yoke 4 has a bore 3 which connects the mercury reservoir 14 with the measuring tube 13 through the intermediary of a tap 2 with a connecting bore 1 when the cover 12a of the housing 12 is completely raised in the position shown in Figs. 1, 2 and 3, so that the measuring instrument is in a position for use.

On the cover 12a being swung, the tap 2 is turned through the intermediary of a lever 6, secured to the tap 2 by means of a screw 7 and cooperating with an abutment 8 on the bottom of the housing, so that when the cover is in its fully open position illustrated in Figs. 1, 2 and 3, the lever 6 contacts the abutment 8 at 9 and the mercury reservoir 14 is in communication with the measuring tube 13, whereas when the cover 12a is lowered into the positions shown in Figs. 4, 5, 6 and 7 the tap 2 is turned so that the communication between the mercury reservoir 14 and the measuring tube 13 is automatically interrupted. In Figs. 1, 2 and 3 the connecting bore 1 of the tap 2 registers with the bore 3 of the connecting yoke 4, so that the mercury in the mercury reservoir 14 can come into direct communication with the measuring tube 13. The lever 6, as the cover 12a is swung into its open position, slides along the abutment 8, thereby turning the tap 2 so that the connecting bore 1 comes into register with the bore 3.

Figure 4:
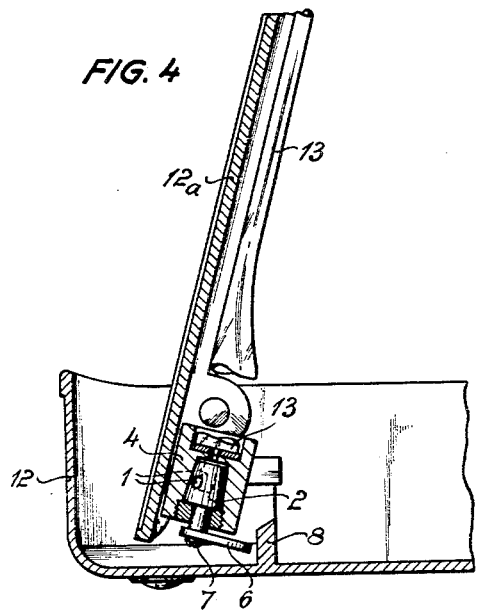
Figs. 4 and 5 are similar sections to those shown in Figs. 2 and 3, with the cover slightly lowered.
Figure 5:
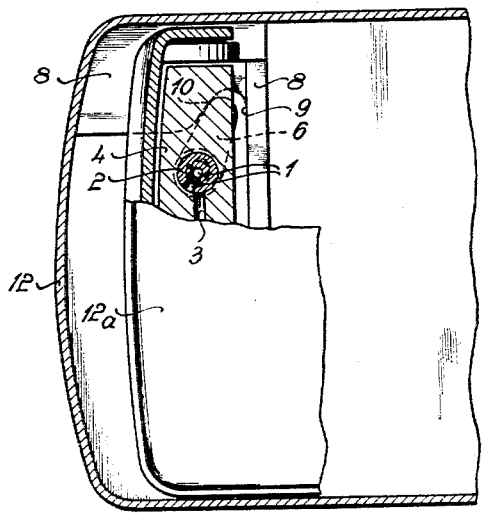

When the cover is in the position shown in Figs. 4 and 5, the lever 6 has moved away from its point of contact 9 and contacts the abutment 8 at 10. During this movement the connecting bore 1 has turned in relation to the bore 3 so that the connection between the mercury reservoir 14 and the measuring tube 13 is already interrupted.

Figure 6:
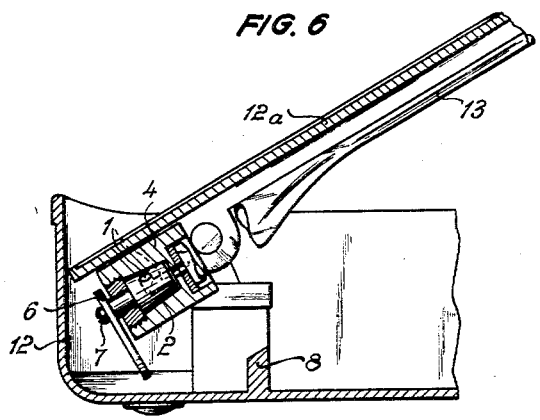
Figs. 6 and 7 are also similar sections to those shown in Figs. 2 and 3, but with the cover lowered still further.
Figure 7:
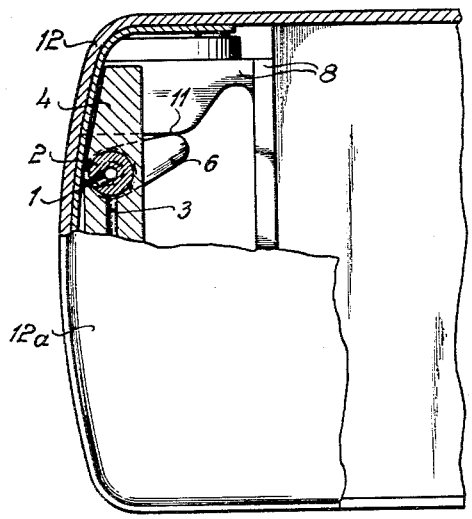

When the cover is in the position shown in Figs. 6 and 7 the bore 1 has turned still further in relation to the bore 3 and the lever 6 is then in contact with the abutment 8 at 11.

From the above detailed description of the invention, it is believed that the construction will at once be apparent, and while there is herein shown and described a preferred embodiment of the invention, it is nevertheless to be understood that minor changes may be made therein without departing from the spirit and scope of the invention as claimed.

I claim:

An apparatus for measuring blood pressure, comprising a portable housing having bottom, side and end walls, a cover hingedly connected to the housing, a yoke secured to the cover on the underside thereof adjacent the point where the cover is hingedly connected to the casing, a reservoir in said yoke having a chamber to provide a mercury reservoir, a measuring tube supported by said cover and having one end received in an opening in said yoke, a duct connecting said reservoir to said tube, a valve member interposed in said duct and rotatably mounted in said yoke, an actuating arm on said valve member and abutments in said housing adapted to engage said arm when said cover is in its open position to open said valve and permit communication between said reservoir and measuring tube, and another projection in said housing in the path of said arm adapted to be engaged by said arm when said cover is moved to its closed position to close said valve and interrupt the supply of mercury through said duct when the cover is in a closed position, said valve being provided with a bore having a portion extending axially in alignment with the opening in the yoke for the lower end of the measuring tube with a radial bore adapted to register with that portion of the duct communicating with the mercury reservoir.

References Cited in the file of this patent

UNITED STATES PATENTS

| 1,139,519 | Haseltine | May 18, 1915 |
| 1,659,393 | Dickinson et al. | Feb. 14, 1928 |
| 1,830,829 | Eyster | Nov. 10, 1931 |